United States Patent [19]

Danowski

[11] Patent Number: 5,085,773
[45] Date of Patent: Feb. 4, 1992

[54] ANTI-STATIC FUEL FILTER

[75] Inventor: Daniel R. Danowski, Richmond, R.I.

[73] Assignee: Allied-Signal Inc., Morristown, N.J.

[21] Appl. No.: 609,569

[22] Filed: Nov. 6, 1990

[51] Int. Cl.$^5$ .............. B01D 35/06; B01D 35/02; B01D 35/22

[52] U.S. Cl. .............. 210/446; 210/243; 210/314; 210/335; 210/321.64; 210/510.1; 123/538

[58] Field of Search .............. 210/243, 446, 321.64, 210/321.84, 335, 314, 510.1; 123/538

[56] References Cited

U.S. PATENT DOCUMENTS

| | | | |
|---|---|---|---|
| 1,102,685 | 7/1914 | Proper | 210/446 |
| 1,146,748 | 7/1915 | Bennett | 210/446 |
| 2,065,658 | 12/1936 | Compton | 210/446 |
| 3,231,091 | 1/1966 | Kingsbury et al. | 210/335 |
| 3,361,261 | 1/1968 | Fairey et al. | 210/446 |
| 4,610,783 | 9/1986 | Hudson | 210/446 |
| 4,759,842 | 7/1988 | Frees et al. | 210/446 |

FOREIGN PATENT DOCUMENTS 52607 12/1981 Japan .............. 210/335

*Primary Examiner*—Stanley S. Silverman
*Assistant Examiner*—Neil M. McCarthy
*Attorney, Agent, or Firm*—Ken C. Decker; William N. Antonis

[57] ABSTRACT

A fuel filter for the fueling system of a motor vehicle has a non-conductive housing defining a chamber in which porous sintered plastic discs are mounted transversely across the chamber defined by the housing. The discs are of graduated porosity, and tend to strip electrons from the hydrocarbon paraffin of which the fuel consists. The charges generated by the stripping are neutralized by the positive ions generated by an adjacent disc.

10 Claims, 1 Drawing Sheet

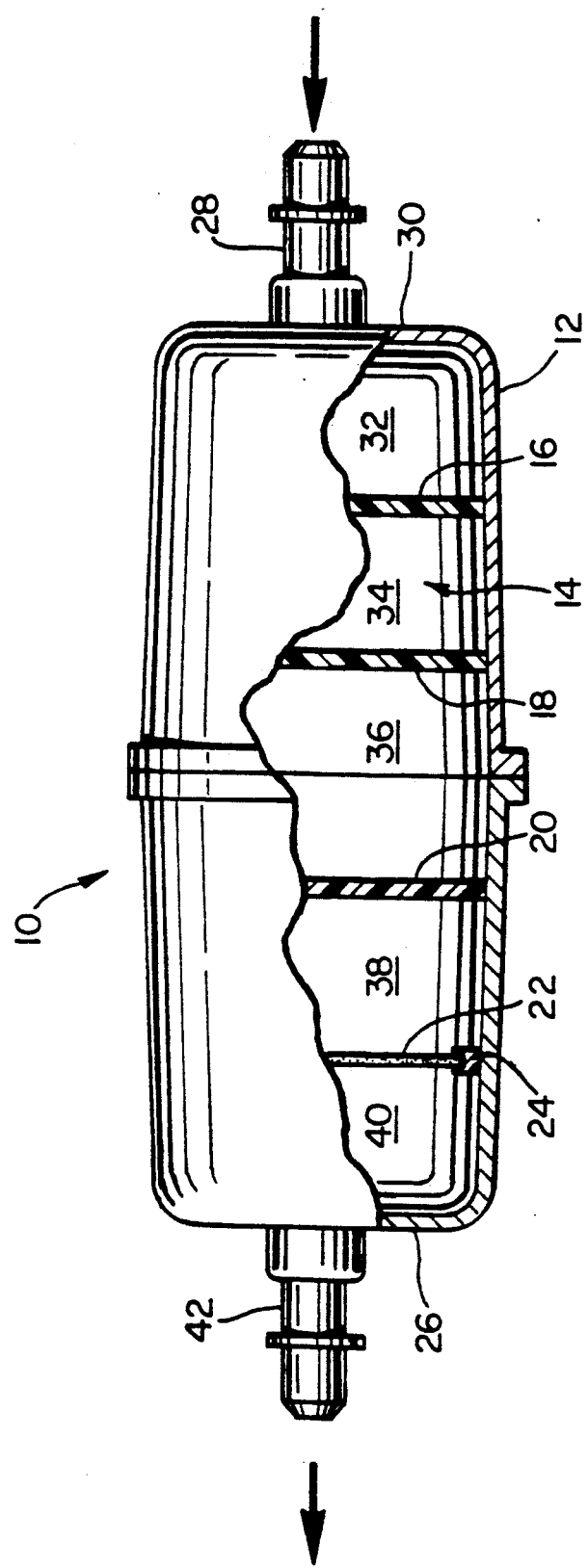

ANTI-STATIC FUEL FILTER

This invention relates to a fuel filter for filtering fuel for delivery to a motor vehicle engine.

The housings for filters used to filter the fuel delivered to a motor vehicle engine have commonly been made of metal or a non-metallic polymer material. Because of their inherently lower cost and other advantages, non-metallic fuel filters are preferred. Such non-metallic fuel filters have been commonly used on vehicles having carburetored engines without problems for many years. However, when prior art non-metallic fuel filters were used on vehicles equipped with electronic fuel injection (EFI) systems, the non-metallic housings occasionally broke down and started leaking. Since leaking fuel is extremely dangerous, any leakage from a fuel filter is unacceptable. Accordingly, metallic filters have been used in vehicle equipped with electronic fuel injection systems.

It has been discovered that prior art fuel system filters with non-metallic housings broke down and began leaking due to electrostatic discharges through the housing due to a build up of electrostatic charges within the filter. When hydrocarbons pass through a filter, electrons are stripped off of the hydrocarbon paraffin, thus causing negative electrostatic charges to build up upstream of the filter media, so that the fuel downstream of the filter media has an excess of positive ions. Although a body of an automotive vehicle is commonly considered to be "grounded", the vehicle ground is effected by a connection with the negative terminal of the vehicle battery, so that the "ground" is really slightly positive with respect to an earth ground. Accordingly, when negative charges build sufficiently in the fuel within the fuel filter, a discharge can take place if the filter is within "striking distance" of the positive vehicle body. This discharge takes place initially at a microscopic level, causing small "pinholes" to be formed in the body. When enough of these pinholes are concentrated in a given area, the housing begins to leak. The quantity of electrons stripped by the filtering media, and, accordingly, the level of electrostatic charges generated within the housing, is a function of the flow rate through the medium. Accordingly, the problem is much greater in vehicles equipped with recirculatory fuel systems.

The present invention solves the problem of leaking non-metallic fuel filter housings by providing a filtering media consisting of a series of porous discs of decreasing porosity. Accordingly, the charges in the compartments within the housing between the disc cancel each other out. Although the inlet compartment is negatively charged, this charge is dissipated and diluted by the fuel flow into the housing. The charge in the outlet compartment is positive, but since the vehicle body is slightly positive and there is no attraction between like charges, there will be no electrostatic discharge through the filter housing which might cause leaks.

These and other advantages of the present invention will become apparent from the following the sole FIGURE of which is a partial cross-sectional view of a fuel filter made pursuant to the teachings of the present invention.

Referring now to the drawings, a fuel filter generally indicated by the numeral 10 includes a housing 12 defining a chamber 14 therewithin. Three sintered plastic filter discs 16, 18, and 20 are mounted in the chamber 14 and extend transversely across the chamber. The sintered porous plastic discs 16, 18, and 20 are of a predetermined porosity as will be discussed hereinafter, and are effective to remove contaminants from the fuel communicated through the housing 12 by straining the contaminants from the fuel as it flows through the discs 16, 18, or 20. These sintered plastic discs are available commercially from Porex Technologies Corporation, Fairborn, Ga. The porosity of the disc 16 is greater than the porosity of disc 18, and the porosity of disc 18 is greater than the porosity of the disc 20. For example, the disc 16 will pass particulate contaminants having a dimension as great as 80 microns, the disc 18 will pass particulate contaminants having a dimension as great as 50 microns, and the disc 20 will pass particulate contaminants only if they have a dimension of less than 25 microns. A paper disc 22 is mounted in a rubber washer 24 and is mounted in the chamber 14 between the disc 20 and the end of the chamber 26. The paper disc 22 will pass particulate contaminants only if they are less than about 5 microns The paper disc prevents passage of such plastic particles that might break off of the discs 16–20 from passing out of the filter housing.

An inlet fitting 28 projects from the end 30 of the housing 12 opposite the end 26. The fitting 28 is connected to vehicle fuel line (not shown) which communicates fuel to the fuel filter 10 from the vehicle fuel tank. The disc 16 cooperates with the end 30 to divide the chamber 14 into and inlet section 32. Similarly, the disc 16 cooperates with the disc 18 to define a section 34, the disc 18 cooperates with disc 20 to define a section 36, the disc 20 cooperates with disc 22 to define a section 38 of the chamber 14, and the disc 22 cooperates with the end 26 to define an outlet section 40 of the chamber 14. An outlet fitting 42 projects from end 26 of the housing 12 and communicates the outlet section 40 with the fuel line (not shown) which communicates fuel from the filter 10 to the vehicle engine.

As discussed above, electrons are stripped from the fuel communicated through the filter 10 by the disc 16–22 Accordingly, the fuel in inlet section 32 will have an excess of negatively charged electrons due to the stripping action of the fuel passing through the disc 16. Similarly, the disc 16 will pass, due to the stripping action, positively charged ions into the downstream section 34. However, the same fuel will also pass through the disc 18, which also strips electrons from the hydrocarbon paraffin comprising the fuel. Accordingly, the negative electrons generated by the stripping action of the disc 18 will neutralize the positive ions passed into section 34 by the disc 16, so that the charge of the fuel in the section 34 will be neutralized. A similar neutralizing action takes place in the sections 36 and 38, due to the other discs 20, 22. The fuel in outlet section 40 will include positively charged ions. However, these positive charged ions pose no problem, since, as discussed above, the body of the vehicle has a slightly positive charge, due to the fact that it is grounded by connection with the negative terminal of the vehicle battery. Since like charges repel, the positive ions in outlet section 40 will be repelled by the charge on the vehicle body and thus no electrostatic discharge will take place between the fuel in outlet section 40 and the vehicle body.

The electrons stripped by the disc 16 remain in inlet section 32 and thus the fuel in inlet section 32 will be negatively charged. However, since the disc 16 is a relatively porous, open filtering media as compared to the filtering media used in prior art fuel filters which had leakage problems due to electrostatic discharges, the negative charge in the inlet chamber 32 will be substantially less than the negative charge generated on the upstream side of the filtering media in prior art fuel filters. Furthermore, the continuing influx of fuel into the chamber 32 through the inlet fitting 28 tends to continually dilute the charge in the inlet chamber 32. In any case the negative charge becomes so small that it is insufficient to break down the dielectric between the inlet section 32 and the vehicle body. Accordingly, leakage of housing 12 due to electrostatic discharges is prevented. The velocity of the fuel into inlet section 32 through inlet fitting 28 also tends to flush the contaminants from the surface of the disc 16. The inlet section 32 is sufficiently open that there is sufficient volume for the contaminants to collect in the inlet section 32. Although the velocity of the fuel flow is diminished as it passes through the disc 16-22, there is sufficient velocity of the fuel flow through the housing 12 such that at least some contaminants are also flushed off all the discs 18, 20, and 22. These contaminants are retained in the corresponding chambers 34, 36 and 38.

I claim:

1. Fuel filter for filtering fuel communicated to the engine of a motor vehicle and for inhibiting the generation of electrostatic charges in the fuel passing through the filter comprising an electrically non-conductive housing defining a chamber therewithin, an inlet fitting carried by said housing for communicating fuel into said chamber and an outlet fitting carried by said housing for communicating fuel out of said chamber, an upstream filter disc in said chamber cooperating with a downstream filter disc having a pore size smaller than said upstream filter disc, said upstream and downstream filter discs spaced from each other in said chamber to define a section of said chamber between said filter discs, each of said filter discs generating an upstream electrostatic charge in the fuel upstream of the filter discs and a downstream electrostatic charge in the fuel downstream of the filter discs as the fuel passes through the filter discs, the upstream electrostatic charge generated by each of said filter discs being of opposite polarity of the downstream electrostatic charges generated by each filter disc, whereby the upstream electrostatic charge generated by said downstream filter disc in said section cancel the electrostatic charges generated by said upstream filter disc in said section thereby neutralizing the electrostatic charges in said section and thereby preventing electrical discharge through said non-conductive housing and breakdown of the material of said housing.

2. Fuel filter as claimed in claim 1, wherein a final filter disc is mounted in said chamber downstream of the other filter discs, said final filter disc being made of paper, said upstream and downstream filter discs being made of plastic.

3. Fuel filter as claimed in claim 1, wherein the upstream filter disc cooperates with the housing to define an inlet section cooperating with the inlet fitting to receive fuel, said fuel being directed against said upstream disc to flush particulate material off of said disc.

4. Fuel filter as claimed in claim 1, wherein at least one of said discs is made of a sintered plastic material.

5. Fuel filter as claimed in claim 1, wherein a final filtering disc is mounted in said chamber downstream of the downstream filtering disc, said final filter disc cooperating with the housing to define an outlet section communicating with the outlet fitting, said final filtering disc inducing a downstream electrostatic charge in said outlet section and an upstream electrostatic charge.

6. Fuel filter as claimed in claim 5, wherein the motor vehicle carries an electrical charge, and the electrostatic charge induced by said final filtering media in said outlet section being of the same polarity of the electrical charge normally carried by the motor vehicle.

7. Fuel filter as claimed in claim 5, wherein said upstream, downstream and final filtering disc have progressively smaller pore sizes to capture progressively smaller particulate contaminants as the fuel being filtered passes through said housing.

8. Fuel filter as claimed in claim 7, wherein said upstream and downstream filtering disc are made of plastic and said final filtering disc is made of paper.

9. Fuel filter as claimed in claim 7, wherein the upstream filtering disc cooperates with the housing to define an inlet section cooperating with the inlet fitting to receive fuel, said fuel being directed against said upstream filtering disc to flush particulate material off of said upstream filtering disc.

10. Fuel filter as claimed in claim 5, wherein the upstream filtering disc cooperates with the housing to define an inlet section cooperating with the inlet fitting to receive fuel, said fuel being directed against said upstream filtering disc to flush particulate material off of said upstream filtering disc.

* * * * *